United States Patent
Kloth et al.

(10) Patent No.: US 6,842,453 B1
(45) Date of Patent: *Jan. 11, 2005

(54) METHOD AND APPARATUS FOR IMPLEMENTING FORWARDING DECISION SHORTCUTS AT A NETWORK SWITCH

(75) Inventors: Ray Kloth, Mountain View, CA (US); Thomas J. Edsall, Mountain View, CA (US); Luca Cafiero, Palo Alto, CA (US)

(73) Assignee: Cisco Technology, San Jose, CA (US)

( * ) Notice: Subject to any disclaimer, the term of this patent is extended or adjusted under 35 U.S.C. 154(b) by 934 days.

This patent is subject to a terminal disclaimer.

(21) Appl. No.: 09/617,581

(22) Filed: Jul. 14, 2000

Related U.S. Application Data

(63) Continuation of application No. 08/951,820, filed on Oct. 14, 1997, now Pat. No. 6,147,993.

(51) Int. Cl.[7] ............................................... H04L 12/28
(52) U.S. Cl. ..................................... 370/392; 370/401
(58) Field of Search .............................. 370/389, 392, 370/400, 401, 402, 403, 393

(56) References Cited

U.S. PATENT DOCUMENTS

| | | | |
|---|---|---|---|
| 4,821,265 A | 4/1989 | Albal et al. | 370/110.1 |
| 4,864,559 A | 9/1989 | Perlman | 370/60 |
| 4,893,302 A | 1/1990 | Hemmady et al. | 370/60 |
| 5,018,137 A | 5/1991 | Backes et al. | 370/85.13 |
| 5,027,350 A | 6/1991 | Marshall | 370/85.13 |
| 5,088,032 A | 2/1992 | Bosack | 395/200 |
| 5,138,615 A | 8/1992 | Lamport et al. | 370/94.3 |
| 5,274,631 A | 12/1993 | Bhardwaj | 370/60 |
| 5,331,637 A | 7/1994 | Francis et al. | 370/54 |
| 5,353,283 A | 10/1994 | Tsuchiya | 370/60 |
| 5,361,256 A | 11/1994 | Doeringer et al. | 370/60 |

(List continued on next page.)

OTHER PUBLICATIONS

*Cisco 7000 Series Gains Fast Ethernet Interface, Becomes Only Router Family to Support Three High–Speed Network Types,* www.cisco.com/warp/public/146/199.html, Copyright 1996, pp. 1–2.

*Cisco Catalyst Workgroup Switch Version 3.0,* www.cisco.com/warp/public/558/16.html, Copyright 1996, pp. 1–5.

*ISL Configurations for Cisco IOS and the Catalyst 5000,* www.cisco.com/warp/public/741/8.html, Copyright 1996, pp. 1–8.

*Catalyst 5000 Software Release 2.1 Feature Set,* www.cisco.com/warp/public/729/c5000/426_pp.html, 1998, pp. 1–9.

(List continued on next page.)

*Primary Examiner*—Chau Nguyen
*Assistant Examiner*—Soun-Dong Myun
(74) *Attorney, Agent, or Firm*—Cesari and McKenna, LLP; A. Sidney Johnston

(57) ABSTRACT

A shortcut technique implements forwarding decision shortcuts at a switch for frames routed between subnetworks of a computer network. The switch monitors the flow of a first frame of a particular type to and from the router, which renders a forwarding decision for routing the frame. The switch records information stored in network layer header of a packet encapsulated within the first frame, and then compares that information with the information stored in network layer headers of packets contained within subsequent frames of that particular type. Forwarding decisions for these subsequent frames are then rendered by hardware logic circuits of the switch rather than by the router.

36 Claims, 7 Drawing Sheets

U.S. PATENT DOCUMENTS

| | | |
|---|---|---|
| 5,394,402 A | 2/1995 | Ross .................... 370/94.1 |
| 5,414,704 A | 5/1995 | Spinney .................... 370/60 |
| 5,418,779 A | 5/1995 | Yemini et al. ............ 370/54 |
| 5,420,862 A | 5/1995 | Perlman ............ 370/85.13 |
| 5,442,633 A | 8/1995 | Perkins et al. ........... 370/94.1 |
| 5,473,607 A | 12/1995 | Hausman et al. ....... 370/85.13 |
| 5,500,860 A | 3/1996 | Perlman et al. ......... 370/85.13 |
| 5,511,168 A | 4/1996 | Perlman et al. ............ 395/200 |
| 5,548,585 A | 8/1996 | Lagoutte et al. ............ 370/60 |
| 5,583,996 A | 12/1996 | Tsuchiya ............ 395/200.15 |
| 5,600,644 A | 2/1997 | Chang et al. ............. 370/404 |
| 5,612,959 A | 3/1997 | Takase et al. ............. 370/390 |
| 5,617,421 A | 4/1997 | Chin et al. ................ 370/402 |
| 5,633,858 A | 5/1997 | Chang et al. ............. 370/255 |
| 5,633,866 A | 5/1997 | Callon ....................... 370/397 |
| 5,633,869 A | 5/1997 | Burnett et al. ............ 370/396 |
| 5,684,800 A | 11/1997 | Dobbins et al. ........... 370/401 |
| 5,740,171 A | 4/1998 | Mazzola et al. ........... 370/392 |
| 5,742,604 A | 4/1998 | Edsall et al. ............... 370/401 |
| 5,754,547 A | 5/1998 | Nakazawa ................ 370/401 |
| 5,764,636 A | 6/1998 | Edsall ....................... 370/401 |
| 5,796,732 A | 8/1998 | Mazzola et al. ........... 370/362 |
| 5,796,740 A | 8/1998 | Perlman et al. ........... 370/401 |
| 5,818,842 A | 10/1998 | Burwell et al. ............ 370/397 |
| 5,828,844 A | 10/1998 | Civanlar et al. ........ 395/200.58 |
| 5,835,720 A | 11/1998 | Nelson et al. .......... 395/200.54 |
| 5,898,686 A | 4/1999 | Virgile ....................... 370/381 |
| 5,909,441 A | 6/1999 | Alexander, Jr. et al. ..... 370/395 |
| 5,909,550 A | 6/1999 | Shankar et al. ........ 395/200.57 |
| 5,910,955 A | 6/1999 | Nishimura et al. ......... 370/401 |
| 5,968,126 A | 10/1999 | Ekstrom et al. ............ 709/225 |
| 5,982,773 A | 11/1999 | Nishimura et al. ......... 370/395 |
| 5,999,536 A | 12/1999 | Kawafuji et al. ........... 370/401 |
| 6,049,834 A | 4/2000 | Khabardar et al. |

OTHER PUBLICATIONS

*ISL Functional Specification*, www.cisco.com/warp/public/741/4.html, Copyright 1996, pp. 1–4.

*Cisco VLAN Roadmap*, www.cisco.com/warp/public/538/7.html, Copyright 1996, pp. 1–9.

*Cisco Announces Token–Ring Switching Products*, IAC Newsletter Database, Copyright 1995, pp. 4–5.

*Cisco Announces New Fast Ethernet Inferface*, LAC Newsletter Database, Copyright 1995, pp. 2–3.

*Virtual LANs*, Chapter 2, Catalyst 2820 Series and Catalyst 1900 Series Enterprise Edition Software Configuration Guide; pp. 2–1–2–49.

*Configuring VTP and Virtual LANs*, Chapter 13, Catalyst 5000 Series Software Configuration Guide, pp. 13–1—13–24.

*Dynamic Inter–Switch Link Protocol*, Configuring DSL, pp. 2–6.

Draft Standard P802.1Q/D10, IEEE Standards for Local and Metropolitan Area Networks: Virtual Bridged Local Area Networks, Copyright 1997, pp. 1–212.

Draft Standard for Virtual Bridged Local Area Networks, P802.1Q/D5, Feb. 28, 1997, pp. 1–88.

FIG. 6

| MAC | HW-SC | XTAG |
|---|---|---|
| B | 0 | 0 |
| R | 1 | 45 |
| D | 0 | 0 |
| E | 0 | 0 |

<<48>>  <<1>>  <<12>>

606 — MAC
602 — HW-SC
604 — XTAG
600

FIG. 7

| l3_da | l3_sa | port_pr | find_sc | rwvlan | xtag | index |
|---|---|---|---|---|---|---|
| 1.2.3.4 | 5.6.7.8 | 0 | 0 | BLUE | 0 | 1025 |
| 1.2.4.1 | 5.6.1.2 | 0 | 1 | BLUE | 0 | 1025 |
| 5.6.7.8 | 1.2.3.4 | 0 | 0 | RED | 0 | 1025 |
| 1.2.1.1 | 5.6.3.4 | 0 | 0 | BLUE | 0 | 1025 |

<<32>>  <<32>>  <<32>>  <<1>>  <<12>>  <<12>>  <<17>>

702 — l3_da
704 — l3_sa
714 — port_pr
708 — find_sc
712 — rwvlan
706 — xtag
710 — index
700

METHOD AND APPARATUS FOR IMPLEMENTING FORWARDING DECISION SHORTCUTS AT A NETWORK SWITCH

CROSS-REFERENCE TO RELATED APPLICATION

This application is a continuation of application Ser. No. 08/951,820, filed Oct. 14, 1997 U.S. Pat. No. 6,147,993, issued Nov. 14, 2000, entitled "Method and Apparatus for Implementing Forwarding Decision Shortcuts at a Network Switch." The entirety of said copending application is hereby incorporated herein by reference.

FIELD OF THE INVENTION

This invention relates generally to computer networks and, more specifically, to routing of packets within a computer network using a switch.

BACKGROUND OF THE INVENTION

Data communication in a computer network involves the exchange of data between two or more entities interconnected by communication links and subnetworks. These entities are typically software programs executing on hardware computer platforms, such as end stations and intermediate stations. Examples of an intermediate station may be a router or switch which interconnects the communication links and subnetworks to enable transmission of data between the end stations. A local area network (LAN) is an example of a subnetwork that provides relatively short distance communication among the interconnected stations, whereas a wide area network enables long distance communication over links provided by public or private telecommunications facilities.

Communication software executing on the end stations correlate and manage data communication with other end stations. The stations typically communicate by exchanging discrete packets or frames of data according to predefined protocols. In this context, a protocol consists of a set of rules defining how the stations interact with each other. In addition, network routing software executing on the routers allow expansion of communication to other end stations. Collectively, these hardware and software components comprise a communications network and their interconnections are defined by an underlying architecture.

Modern communications network architectures are typically organized as a series of hardware and software levels or "layers" within each station. These layers interact to format data for transfer between, e.g., a source station and a destination station communicating over the network. Predetermined services are performed on the data as it passes through each layer and the layers communicate with each other by means of the predefined protocols. The lower layers of these architectures are generally standardized and are typically implemented in hardware and firmware, whereas the higher layers are generally implemented in the form of software running on the stations attached to the network. An example of such a communications architecture is the Internet communications architecture.

The Internet architecture is represented by four layers which are termed, in ascending interfacing order, the network interface, internetwork, transport and application layers. These layers are arranged to form a protocol stack in each communicating station of the network. FIG. 1 illustrates a schematic block diagram of prior art Internet protocol stacks 125 and 175 used to transmit data between a source station 110 and a destination station 150, respectively, of a network 100. As can be seen, the stacks 125 and 175 are physically connected through a communications channel 180 at the network interface layers 120 and 160. For ease of description, the protocol stack 125 will be described.

In general, the lower layers of the communications stack provide internetworking services and the upper layers, which are the users of these services, collectively provide common network application services. The application layer 112 provides services suitable for the different types of applications using the network, while the lower network interface layer 120 accepts industry standards defining a flexible network architecture oriented to the implementation of LANs.

Specifically, the network interface layer 120 comprises physical and data link sublayers. The physical layer 126 is concerned with the actual transmission of signals across the communication channel and defines the types of cabling, plugs and connectors used in connection with the channel. The data link layer (i.e., "layer 2") is responsible for transmission of data from one station to another and may be further divided into two sublayers: Logical Link Control (LLC 122) and Media Access Control (MAC 124).

The MAC sublayer 124 is primarily concerned with controlling access to the transmission medium in an orderly manner and, to that end, defines procedures by which the stations must abide in order to share the medium. In order for multiple stations to share the same medium and still uniquely identify each other, the MAC sublayer defines a hardware or data link address called a MAC address. This MAC address is unique for each station interfacing to a LAN. The LLC sublayer 122 manages communications between devices over a single link of the network.

The primary network layer protocol of the Internet architecture is the Internet protocol (IP) contained within the internetwork layer 116 (i.e., "layer 3"). IP is a network protocol that provides internetwork routing and that relies on transport protocols for end-to-end reliability. An example of such a transport protocol is the Transmission Control Protocol (TCP) contained within the transport layer 114. The term TCP/IP is commonly used to refer to the Internet architecture.

Data transmission over the network 100 therefore consists of generating data in, e.g., sending process 104 executing on the source station 110, passing that data to the application layer 112 and down through the layers of the protocol stack 125, where the data are sequentially formatted as a frame for delivery onto the channel 180 as bits. Those frame bits are then transmitted over an established connection of channel 180 to the protocol stack 175 of the destination station 150 where they are passed up that stack to a receiving process 174. Data flow is schematically illustrated by solid arrows.

Although actual data transmission occurs vertically through the stacks, each layer is programmed as though such transmission were horizontal. That is, each layer in the source station 110 is programmed to transmit data to its corresponding layer in the destination station 150, as schematically shown by dotted arrows. To achieve this effect, each layer of the protocol stack 125 in the source station 110 typically adds information (in the form of a header) to the data generated by the sending process as the data descends the stack.

For example, the internetwork layer encapsulates data presented to it by the transport layer within a packet having a network layer header. The network layer header contains, among other information, source and destination (logical) network addresses needed to complete the data transfer. The data link layer, in turn, encapsulates the packet in a frame that includes a data link layer header containing information required to complete the data link functions, such as (physical) MAC addresses. At the destination station 150, these encapsulated headers are stripped off one-by-one as the frame propagates up the layers of the stack 175 until it arrives at the receiving process.

A router is an intelligent intermediate node that implements network services such as route processing, path determination and path switching functions. The router also provides interfaces for a wide range of communication links and subnetworks. The route processing function allows a router to determine the type of routing needed for a packet, whereas the path switching function allows a router to accept a packet on one interface and forward it on a second interface. The path determination, or forwarding decision, function enables the router to select the most appropriate interface for forwarding a packet.

A switch provides the basic functions of a bridge including filtering of data traffic by MAC address, "learning" of a MAC address based upon a source MAC address of a frame and forwarding of the frame based upon a destination MAC address. In addition, the switch provides the path switching capability of a router. Path switching is typically separated from the forwarding decision processing of a router to enable high-speed, interface-level "switching" at the switch.

However, rendering of forwarding decisions at the router is time consuming and impedes the efficiency of packet forwarding operations. A solution to this problem has been to integrate the router within the switch; yet, this approach is costly. The present invention is directed to a cost-effective technique for offloading packet forwarding decisions from a router to a switch.

SUMMARY OF THE INVENTION

The invention comprises a technique for implementing forwarding decision shortcuts at a switch for frames routed between subnetworks of a computer network. According to the technique, the switch monitors the flow of a first frame of a particular type to and from the router, which renders a forwarding decision for routing the frame. The switch records information stored in a network layer header of a packet encapsulated within the first frame, and then compares that information with the information stored in network layer headers of packets contained within subsequent frames of that particular type. Forwarding decisions for these subsequent frames are then rendered by hardware logic circuits of the switch rather than by the router.

For example, a source station sends the first frame through the switch to the router, which then passes the frame back to the switch for forwarding on to a destination station through an appropriate port of the switch. The switch observes the transaction flow to and from the router, and records the network layer routing decision rendered for the frame so that it can "learn" and thus perform the same operation on behalf of the router. The learning process is generally applied to the source/destination address pair of the network layer header, although it could apply to just the network layer destination address. After the switch learns the network layer operation performed on the packet of the frame, data frame traffic of a similar type are not passed to the router but are rather routed to the appropriate port by the switch.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 6 illustrates an embodiment of a forwarding table in accordance with the present invention;

FIG. 7 illustrates an embodiment of a shortcut table in accordance with the present invention.

DETAILED DESCRIPTION OF ILLUSTRATIVE EMBODIMENT

Figure 2:
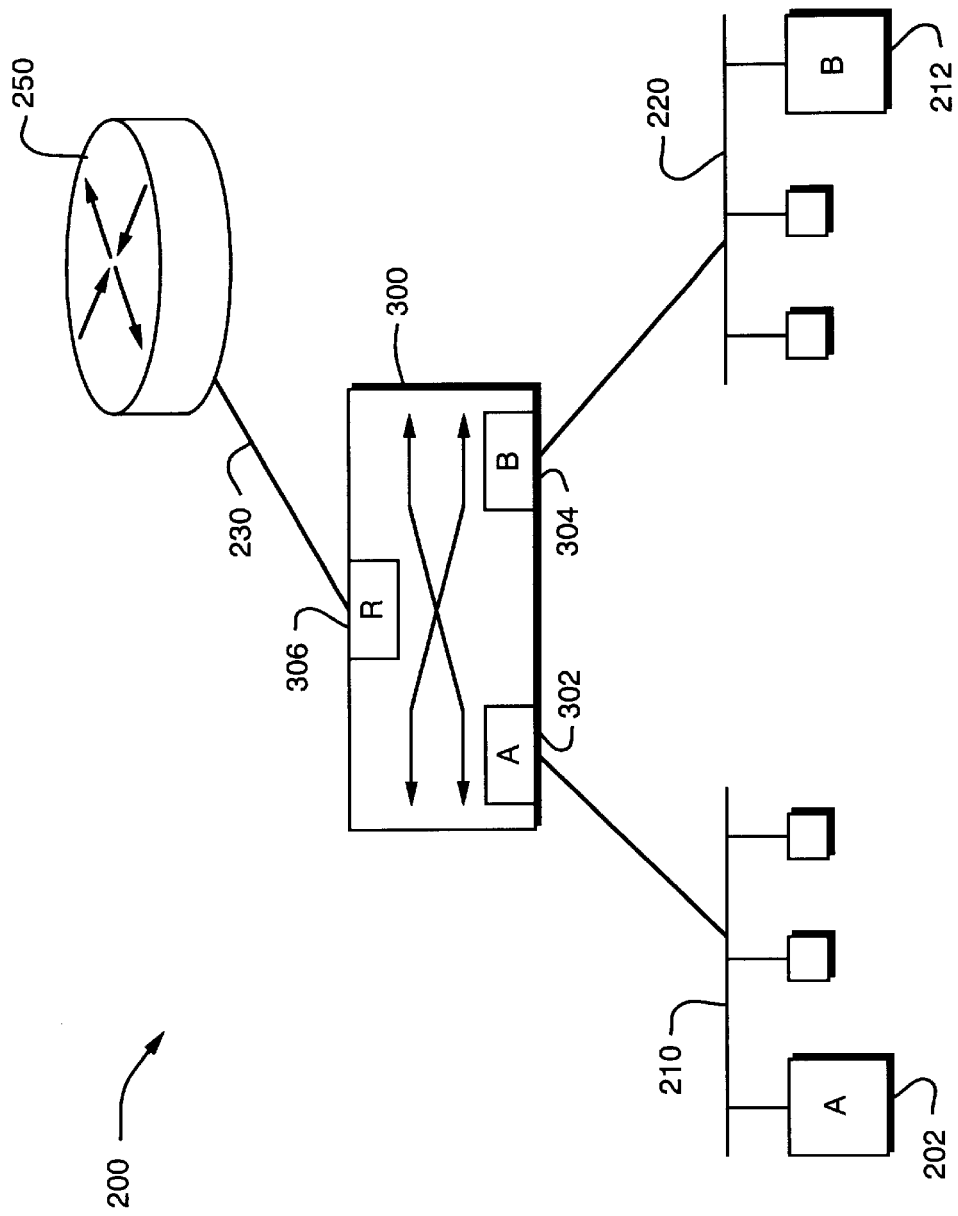
FIG. 2 is a block diagram of a computer network comprising a collection of interconnected communication links and subnetworks attached to a plurality of stations.

FIG. 2 is a block diagram of a computer network 200 comprising a collection of interconnected communication links and subnetworks attached to a plurality of stations. The stations are typically computers comprising end stations 202, 212 and intermediate stations 250, 300. Specifically, the intermediate station 250 is a router and the intermediate station 300 is a network switch, whereas the end stations 202, 212 may include personal computers or workstations.

Each station typically comprises a plurality of interconnected elements, such as a processor, a memory and a network adapter. The memory may comprise storage locations addressable by the processor and adapter for storing software programs and data structures associated with the inventive shortcut technique. The processor may comprise processing elements or logic for executing the software programs and manipulating the data structures. An operating system, portions of which are typically resident in memory and executed by the processor, functionally organizes the station by, inter alia, invoking network operations in support of software processes executing on the station. It will be apparent to those skilled in the art that other processor and memory means, including various computer readable media, may be used for storing and executing program instructions pertaining to the techniques described herein.

The subnetworks included within network 200 preferably comprise local area networks (LANs) 210 and 220, although the invention may work advantageously with communication links such as wide area network links. In the illustrative embodiment, the switch 300 is a 3-port bridge comprising port A 302 coupled to Station A via LAN 210, port B 304 coupled to Station B via LAN 220 and port R 306 coupled to router 250 via link 230. Communication among the stations of the network is typically effected by exchanging discrete data frames or packets between the communicating nodes according to a predefined protocol. For the illustrative embodiment described herein, the predefined protocol is the Internet protocol (IP), although the invention could be implemented with other protocols, such as the Internet Packet Exchange (IPX) protocol.

Since stations A and B are on different subnetworks, they communicate by way of router 250. For example, station A forwards a frame through switch 300 to router 250 and the router performs a forwarding decision to route the frame through the switch to Station B. Rendering of forwarding decisions at the router is generally time consuming and the present invention is directed to a cost-effective technique for offloading packet forwarding decisions from a router to a switch.

Figure 1:
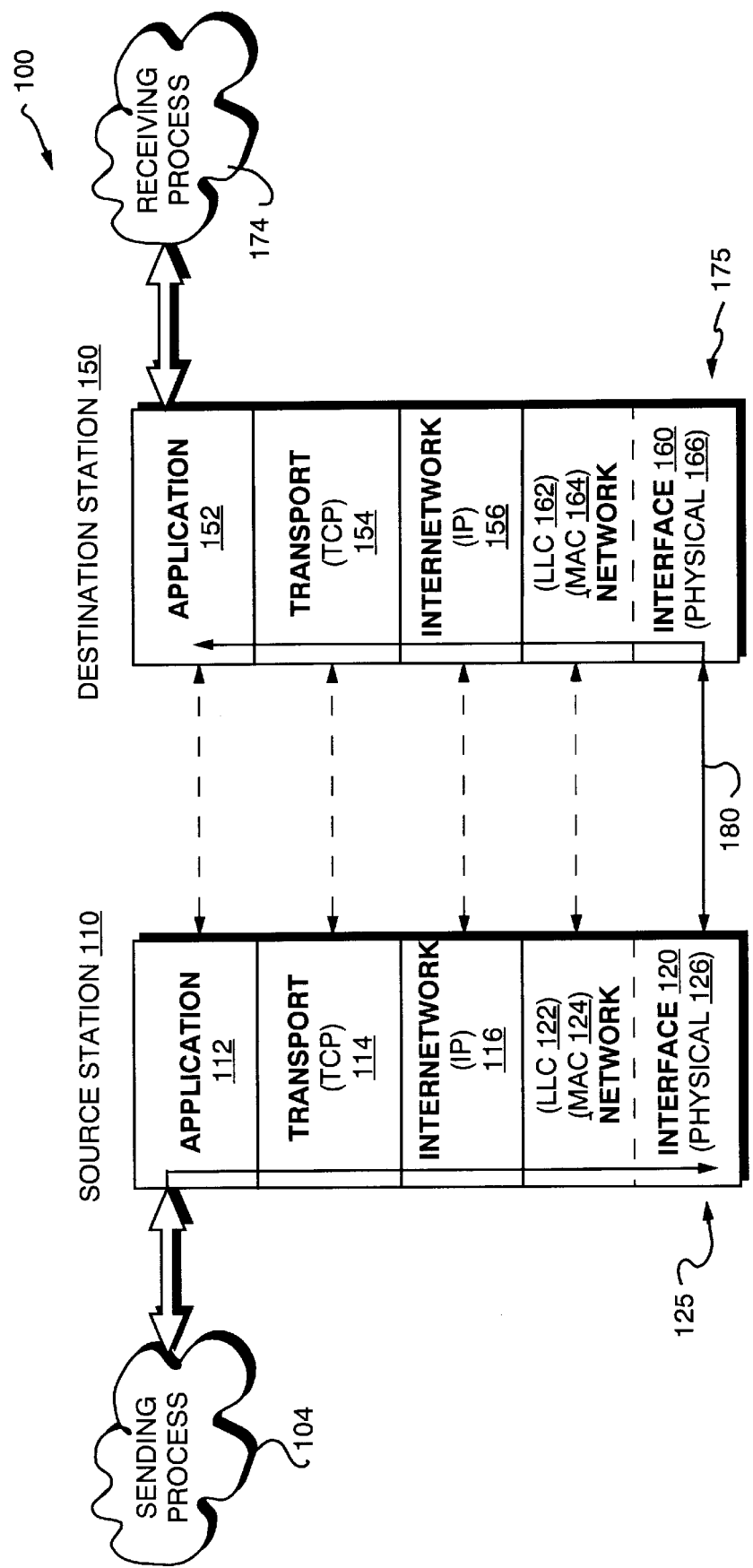
FIG. 1 is a schematic block diagram of prior art communications architecture protocol stacks used to transmit data between stations of a computer network.

According to the invention, the switch 300 observes the transformation of a frame/packet passed up a protocol stack (such as stack 125 in FIG. 1) from the data link layer (i.e., "layer 2") to the internetwork layer (i.e., "layer 3") of router 250, where a routing decision is rendered using, e.g., the IP network protocol, and coming back down the stack so as to acquire sufficient information to route the frame. That is, the switch records the logical addresses and other information provided by the router within the layer 3 header, and subsequently "learns" the route by essentially comparing that information with the information stored in the layer 2 header, and noting the differences. Thereafter, frames of the same type are not passed to the router. Layer 3 processing still occurs when the switch routes similar type frames from subnetwork A to subnetwork B but, as described herein, that processing is implemented in hardware on the switch. Notably, the switch examines and routes only high-volume data traffic frames that require simple routing operations; it does not process control or other router-specific frames such as those pertaining to router protocols.

Figure 3:
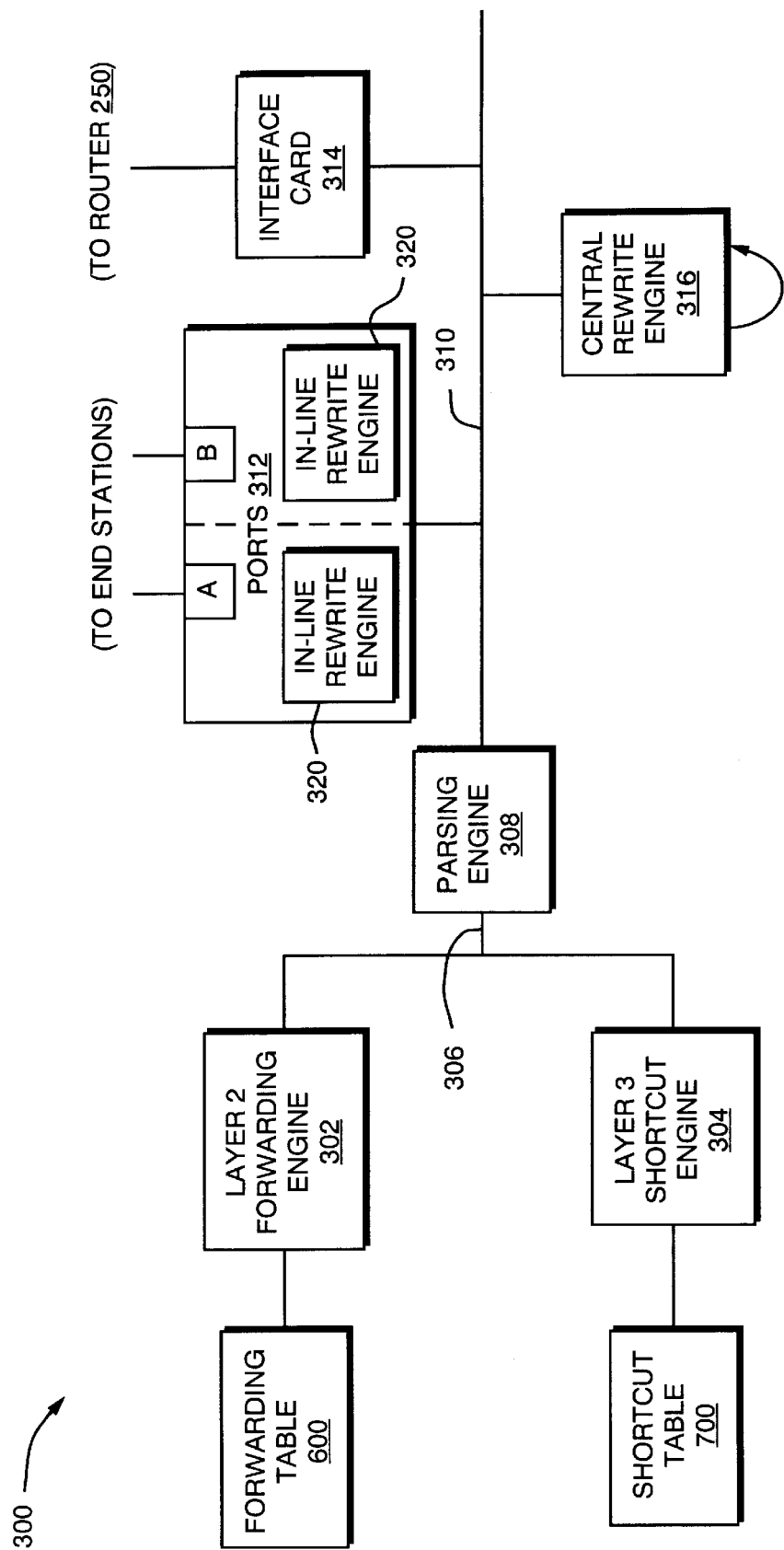
FIG. 3 is a schematic block diagram of a network switch configured to implement a novel shortcut technique in accordance with invention.

FIG. 3 is a schematic block diagram of the network switch 300 configured to implement the novel shortcut technique in accordance with invention. The switch includes a layer 2 forwarding engine 302 for accessing and processing information stored in a forwarding table 600, and a layer 3 shortcut engine 304, coupled to the forwarding engine 302, for accessing and processing information stored in a shortcut table 700. Specifically, the forwarding engine 302 and shortcut engine 304 determine actions to be taken on packets passing through the switch 300 and drive the results over a result bus 306. In the illustrative embodiment, the engines 302 and 304 are preferably implemented as a plurality of hardware registers and combinational logic configured to produce a sequential logic circuit, such as a state machine.

The switch 300 further includes a parsing engine 308 that receives the results from the result bus 306 and drives aggregate information onto a switching bus 310 consisting of a 16-bit data bus portion and a 16-bit control bus portion. The parsing engine 308 may further extract pertinent information from packets traversing the switching bus 310 and transfer that information over the result bus 306. Port card ("ports") 312 provides the port interface circuitry needed to connect the switching bus 310 to the physical media of the network, whereas an interface card 314 provides the interface circuitry needed to couple the switch 300 to the router 250. A central rewrite engine 316 may be used to modify frames routed by the switch using rewrite information described herein. In the illustrative embodiment, an in-line rewrite engine 320 is associated with each port and is contained on the port card 312. It will be apparent to those skilled in the art that the in-line and central rewrite engines comprise conventional circuits for modifying "shortcutted" frames with the rewrite information.

Figure 4:
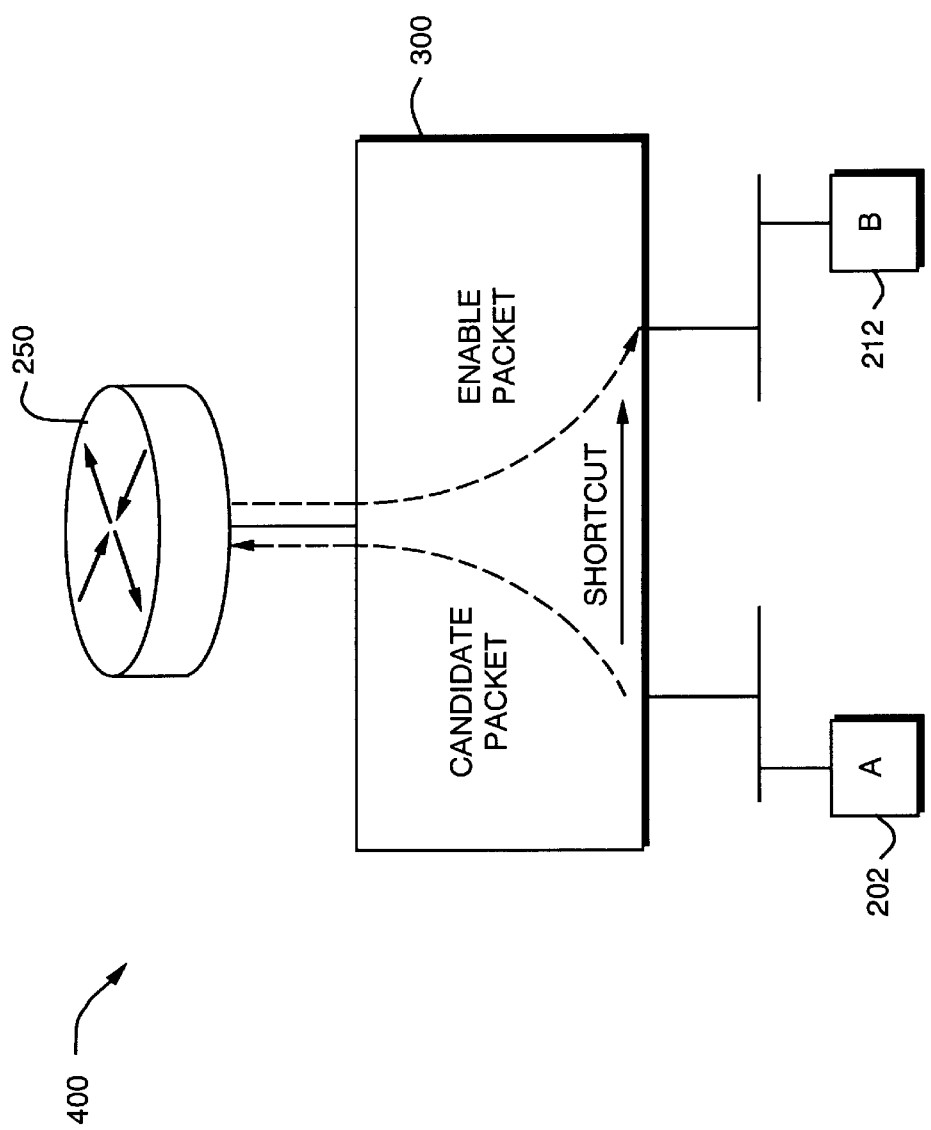
FIG. 4 is a block diagram of an embodiment of the network switch of FIG. 3.

FIG. 4 is a schematic block diagram of an embodiment of the network switch 300 depicting processing of a packet in accordance with the shortcut technique. Station A transfers a first frame to switch 300 which it switches normally to the router 250 as a packet; this first packet is called a candidate packet, i.e., the candidate to be routed. The router processes the packet (e.g., decides where to route it) and sends it back to the switch 300; this packet coming back from the router is called an enable packet because it enables the shortcut. According to the invention, the switch "learns" based on this course of action and applies that action to all other similar frames. In other words, once the shortcut is instituted, then all subsequent similar packets coming from Station A are candidates for the shortcut.

Figure 5:
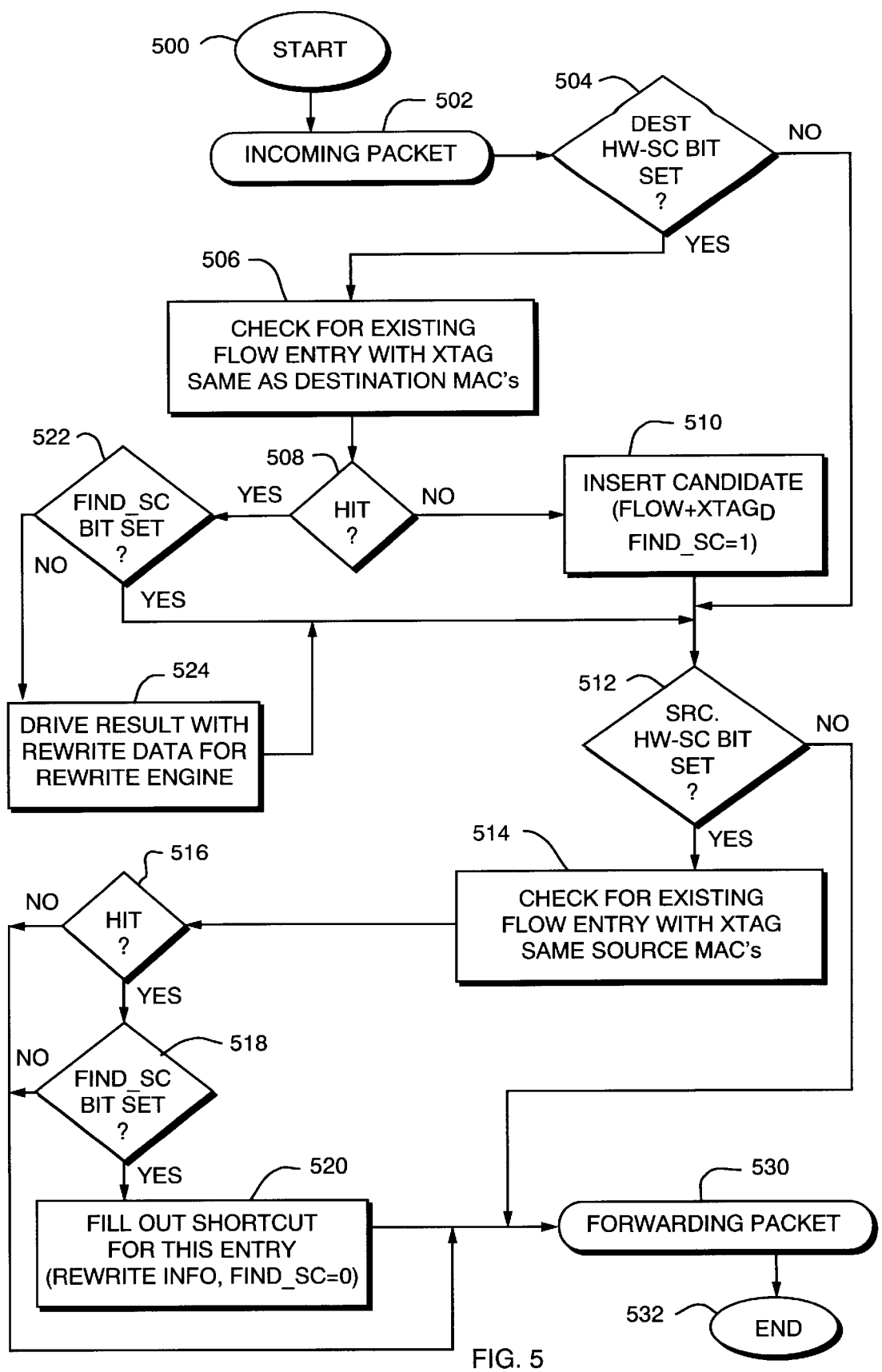
FIG. 5 is a flowchart illustrating the sequence of steps employed by the network switch when implementing the shortcut technique.

FIG. 5 is a flowchart illustrating the sequence of steps employed by the switch when implementing the novel shortcut technique. Initially, the sequence of steps executed by switch 300 when "learning" a candidate packet will be described, followed by those steps directed to learning an enable packet and then executing the actual shortcut within the switch. The sequence starts at Step 500 and proceeds to Step 502 where an incoming frame containing a candidate packet is received at the switch 300. In the illustrative embodiment, the incoming frame of a particular type is generated by Station A and is transmitted to the router 250 via the switch 300. Thus, the destination MAC address of the frame specifies the router and the source MAC address references Station A.

Specifically, the frame is received at a port, e.g, port A, of the switch and transferred over bus 310 to the parsing engine 308 where pertinent information is extracted from the frame and transferred over the result bus 306. For example, the destination MAC address of the incoming frame is extracted and transferred to the layer 2 forwarding engine 302, while flow information of the encapsulated packet is extracted and transferred to the layer 3 shortcut engine 304. A flow is the layer 3 (network layer) information such as an IP destination address, an IP destination/source pair addresses or an IP source/destination pair addresses and protocol port number. In an alternate embodiment, the address and flow information may be parsed from the incoming frame/packet at the port card 312 or the interface card 314.

Using the extracted MAC address, the forwarding engine 302 accesses the forwarding table 600 to determine whether a hardware shortcut (HW-SC) bit 602 is asserted (e.g., Dest HW-SC=1) in Step 504. FIG. 6 illustrates an embodiment of the forwarding table 600 containing, inter alia, the HW-SC bit 602. The destination MAC address is examined to determine whether the packet is one of a subset of packets that may be candidates for shortcuts. If the HW-SC bit 602 is asserted, the MAC address specifies a special destination, such as a router or a multicast packet, the latter of which is "shortcutted" according to the technique because it is ultimately passed to the router. It should be noted that, in the illustrative embodiment, a hash algorithm may be used to access the tables. Also, it should be noted that the router's MAC address could be identified in other ways such as by hardcoding a piece of logic or by a defined protocol.

The defined protocol is provided for communication between the switch and router to obtain the router's MAC address and configure the table 600. An example of such a defined protocol is a protocol extension to the Cisco Discovery Protocol developed by Cisco Systems, Inc. A router configured to interpret the protocol may perform MAC address identification on behalf of a non-configured router. Note that if the MAC address of a router is known, the protocol is not needed; a user may provide the address. The forwarding table 600 is initialized at startup with router MAC addresses using, e.g., the defined protocol.

Having determined that the HW-SC bit 602 is set (the "yes" path), an XTAG 604 associated with the destination MAC address is retrieved from the forwarding table 600; the retrieved XTAG and the extracted flow information are then compared with information stored in the shortcut table 700 relating to the candidate packet (Step 506). FIG. 7 illustrates an embodiment of the shortcut table 700 that is accessed by the layer 3 shortcut engine 304 to determine if an entry is created for a packet having a matching MAC address and XTAG.

The XTAG is generally used for a situation where a router has many associated MAC addresses, preferably one for each port interface. It would be desirable for the router to function as if it had just one MAC address; the XTAG is used to associate several router MAC addresses to a single router. Therefore, a field is provided in the forwarding table 600 associating the router address with an XTAG. If, for example, there are three (3) MAC addresses associated with router 250, each address returns the same XTAG so that it corresponds to a single router.

Specifically, XTAG is a binding (pointer) between a MAC address and a flow, the flow information is contained in the shortcut table 700. The amount of layer 3 information bound to an XTAG depends upon the configuration. For example, if only the destination and source addresses are of interest for a particular configuration, the shortcut table 700 is used to look up the layer 3 (IP) destination address, source address and the associated xtag. Note that entries 13_da 702 and 13_sa 704 are the IP destination and source addresses, and entry 706 contains the associated xtag. Depending on the situation, there can be multiple MAC addresses "pointing" to the same flow or one MAC address pointing to multiple flows. The inquiry in Step 506 ensures that the flow matches that of the MAC address.

The XTAG may be further used to prevent obscure loop conditions that arise when there is a routing change or change in the topology of a network as a result of, e.g., a loss of a link. Unlike router MAC addresses which cannot be changed dynamically, i.e., "on-the-fly", XTAGs can be dynamically altered. By changing the XTAG associated with a MAC address(es) in the forwarding table 600, new shortcut flows can be created instantaneously while those previous shortcut flows associated with the XTAG may be invalidated.

In Step 508, the XTAG associated with the destination MAC address and the extracted flow are examined to determine whether there is a "hit" in the shortcut table 700. A hit denotes that the contents of the xtag entry 706 match the XTAG 604 obtained from the forwarding table and that there is a flow match. If there is not a hit in Step 508, an entry is created in Step 510. For example when the switch 300 is initially powered-up, all entries of the shortcut table 700 are invalid and there is not a hit in Step 508; the "no" path is then followed to populate the entries. Also since the packet of the incoming frame is the first packet directed to a shortcut destination, there is no hit on the table 700.

In Step 510 information pertaining to the candidate (e.g., flow+XTAGD$_D$find_sc=1) are "inserted" into the shortcut table 700 to partially populate the table. Inserting the candidate means loading the flow (P) information, the XTAG 604 that was previously obtained from the forwarding table 600 and a bit that specifies "find shortcut" (find_sc) into respective entries of the shortcut table 700. The flow information may comprise all of the entries of the shortcut table 700 (i.e., an entire flow), although only selected entries are typically used depending upon the level of access list utilization for a particular configuration. The flow information generally comprises at least the IP destination address (13_da) and may further comprise IP destination/source pair (13_da, 13_sa) or destination/source pair and protocol port (13_da, 13_sa and port pr 714).

Therefore, a predetermined content of flow information (flow) is populated in the table 700, along with xtag 706 and find_sc bit 708; note that the flow content will thereafter be compared with the flow information of the packet. The find_sc bit 708 is a flag that when asserted, indicates not all of the information has been acquired to establish a shortcut entry and that rewrite information is still needed to complete the entry. Find_sc=1 thus indicates that the packet is a "candidate" for shortcuts and a candidate entry is therefore created in the shortcut table 700 in Step 510.

The source MAC address of the incoming frame is also extracted by the parsing engine 308 and transferred to the forwarding engine 302. Using that address, the forwarding engine 302 accesses the forwarding table 600 to determine whether the HW-SC bit 602 is asserted (e.g., Src HW-SC=1) in Step 512. Note that each time a packet/frame is forwarded by the switch 300, both the source and destination MAC addresses are examined by the forwarding engine 302. Since the packet originated at Station A, the source station is not a router and the HW-SC bit 602 for the source MAC address is not asserted. Therefore, the sequence proceeds along the "no" path and the packet/fame is routed normally. That is, the frame is forwarded from the switch to the router 250 as a candidate packet based on layer 2 processing; the switch then waits for the packet to be returned from the router (Step 530) so that it can be encapsulated as a frame and routed over the network to a destination, such as Station B. The sequence then ends in Step 532.

The sequence of steps performed by the switch 300 when learning an enable packet will now be described. The sequence starts at Step 500 and proceeds to Step 502 where the router 250 passes the packet destined for Station B back to the switch as an incoming enable packet. The destination and source MAC addresses of the frame encapsulating the packet are transferred to the forwarding engine 302, while the flow information of the packet is transferred to the shortcut engine 304. In Step 504 a determination is made whether the HW-SC bit 602 is asserted based on the destination MAC address. Bit 602 is not asserted for the enable packet because the destination MAC address of the frame does not specify a special destination, such as router 250, but rather specifies Station B. Therefore, the sequence proceeds along the "no" path to Step 512 where a determination is made whether the HW-SC bit 602 is asserted based on the source MAC address. Since the router is the source of this packet, the "yes" path is followed and a shortcut table lookup is performed in Step 514 wherein the flow information for the enable packet and the XTAG associated with the source MAC address are compared with their respective entries of the table 700.

In Step 516, a determination is made as to whether there is a hit in the shortcut table 700. Because the flow information does not change when a router routes a packet and the XTAG is associated with the router's MAC address, there is a hit in the table 700 and the "yes" path is followed. In Step 518 the find_sc bit 708 is accessed and examined by the shortcut engine 304 to determine whether it is asserted. When the candidate entry was inserted (Step 510), the bit 708 was asserted and so the "yes" path is followed.

In Step 520, the "shortcut" entry for the enable packet is loaded into the table 700, which means that the information that has changed about the frame is written (i.e., rewritten) into the respective entry. The changed information includes new source and destination MAC addresses, and a deasserted find_sc bit 708. That is, the source MAC address of the frame encapsulating the enable packet is the MAC address of the router and the destination MAC address is the MAC address of Station B. (Note that when the router 250 routes a packet of a frame, the IP addresses of the packet do not change, only the layer 2 MAC addresses of the frame change.)

At this point, a shortcut entry containing an xtag, a flow and rewrite information has been established in the shortcut table 700 and the required information has been learned by the switch 300. Notably, the fields that the router changes for the enable packet are recorded in respective fields of the shortcut table 700. The sequence then proceeds to Step 530 where the frame gets forwarded as it normally does; no action has yet been taken based on the learned information. As a result of the described sequences, the candidate and enable frames/packets have been "bridged" by the switch 300 (and routed by the router 250) during the learning process; the switch has not yet routed the packets. Although the switch functions normally to forward the frames/packets as specified by the router, it also uses those packets to configure the shortcut table 700.

Refer again to the beginning of the flowchart where a subsequent frame of the same type is generated by Station A and transferred over the network to Station B. The frame has a destination MAC address of the router 250 because it must pass through the router to get to Station B. The incoming frame/packet arrives at the switch at Step 502 specifying the destination MAC address of the router and the source MAC address of Station A. In Step 504 a determination is made whether the Dest HW-SC bit 602 is asserted for the destination MAC address and, since the router is the destination, the "yes" path is followed.

In Step 506, the switch 300 retrieves an XTAG 604 associated with the destination MAC address from the forwarding table 600 and, along with the flow extracted from the packet, compares this information with information (xtag and flow entry) stored in the shortcut table 700 relating to the frame. A decision is then made as to whether there is a hit in Step 508. Since this particular flow entry was previously loaded, there is a hit ("yes" path) and a determination is made in Step 522 as to whether the find_sc bit 708 is asserted. Here, the find_sc=0 because that bit was previously cleared, signifying that the entry is complete. Thus, the "no" path is followed and in Step 524, rewrite information is obtained by the shortcut engine from the respective shortcut entry and driven over the switching bus to the rewrite engine. The sequence of steps then proceeds from Step 512 to Step 530 as previously described.

It should be noted that for those situations where switches are not configured to implement the shortcut technique, e.g., existing switches, the HW-SC bit 602 for a destination MAC address of an incoming frame would not be asserted ("no" path at Step 504,), the HW-SC bit 602 for a source MAC address of the frame would also not be asserted ("no" path at Step 512) and the switch 300 would merely bridge (switch) the packet at Step 530.

As noted, the rewrite information comprises those fields of the packet that are modified by the router, and includes the destination and source MAC address of the frame coming from the router (e.g., source address of router 250 and destination address of Station B) and the number of the port coupled to Station B (i.e., the index 710 in shortcut table 700). The index 710 identifies the physical location of the switch (instead of the router's port) to which the frame is sent to be rewritten. The rewrite information is driven over the switching bus 310 behind the frame (or separately) to the port on card 312 so that the port has the frame and the information needed to modify that frame.

Specifically, the index value 710 is sent down the bus first from the shortcut engine so as to identify the port, e.g., port B, receiving the frame for transmission to Station B rather than the port coupled to the router. The source and destination MAC addresses and the original frame are also sent over the bus 310. The switch 300 has "learned" that the frame should be sent to the port B coupled to Station B rather than to the port coupled to the router. Port B thus has the original frame transmitted by Station A along with the rewrite information and can perform the rewrite operation to make the modifications to the encapsulating frame (e.g., to replace the source and destination addresses of the frame with the source MAC address of the router and the destination MAC address of Station B). As noted, the rewrite engine 320 is preferably located "in-line" on the port card 312, although in other embodiments the engine may be located elsewhere such as in a central location at central rewrite engine 316.

The rewrite information is sent over the bus in a unique format such that the index 710 is sent first to identify the port or central rewrite engine receiving the information. The index is configured at startup so that the hardware of each port "knows" whether it is configured to perform rewrite operations. This is a static configuration by software at power on to populate the appropriate entry 710 of the shortcut table 700. If a port is capable of performing a rewrite operation, it's index is used; otherwise, the index of the central rewrite engine is specified.

Figure 8:
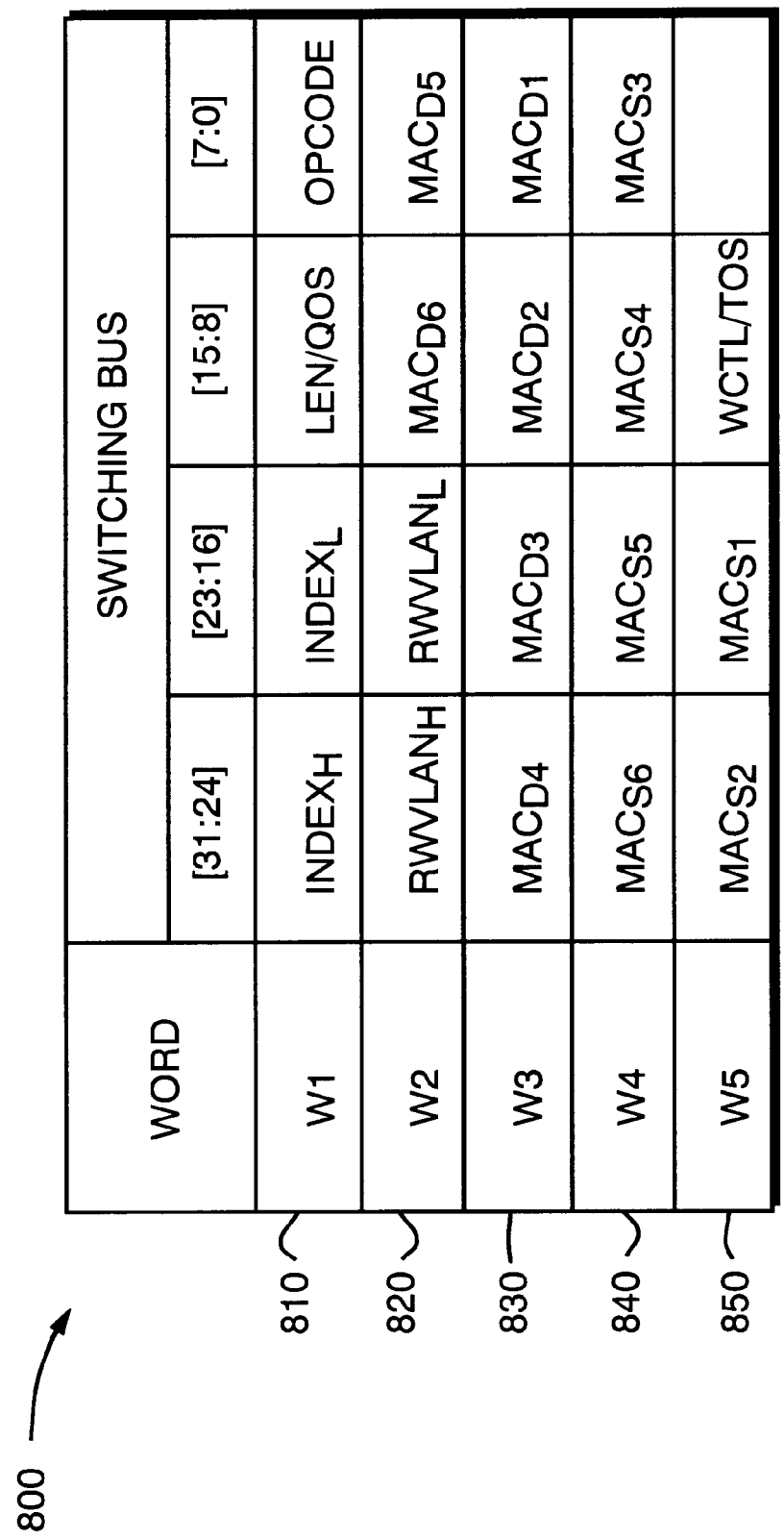
FIG. 8 is a schematic diagram showing a unique format of rewrite information transferred within the switch in accordance with the present invention.

FIG. 8 is a schematic diagram showing the unique format 800 of the rewrite information. Word 1 (W1 810) has a 16-bit (high and low) $INDEX_{H,L}$ value, an 8-bit LEN/QOS value specifying the length of the rewrite information and the quality of service, and an 8-bit OPCODE value that provides information about operations performed on the information. Word 2 (W2 820) has a 2-byte (high and low) rewrite VLAN ($RWVLAN_{H,L}$) value that is used to modify the frame and the upper 2-bytes of the destination $MAC_{D6\text{-}D5}$ address. Word 3 (W3 830) contains the lower 4-bytes of the destination $MAC_{D4\text{-}D1}$ address, word 4 (W4 840) contains the upper 4-bytes of the source $MAC_{S6\text{-}S3}$ address and word 5 (W5 850) contains the lower 2 bytes of the source $MAC_{S6\text{-}S3}$ address, along with a 1-byte WCTL/TOS field. The WCTL portion of the field contains control bits loaded by software from the shortcut table 700; these bits instruct the rewrite engine to perform specific operations with the flow. The TOS bits specify a type of service provided by the router.

The rewrite information is preferably sent over the result bus 306 in a 5-word frame having this unique format 800 to the parsing engine 308 where it is apportioned for transmission over switching bus 310. Specifically, the rewrite information is sent over the control lines of the switching bus and the actual data packet is sent over the data lines.

In summary, the novel shortcut technique applies the concept of bridge learning to route determination to thereby enable the switch to offload forwarding decisions from the router for certain packets. Specifically, the switch "learns" the network layer operation performed on the packet so that frame traffic of a similar type are not passed to the router but are rather routed by the switch. The switch does not process control or other router-specific frames, such as protocols or the like, just high-volume data traffic that requires simple routing operations. Once the router performs the complicated task of determining the routing that needs to be done to the packet, the switch assumes the repetitive task of implementing high-volume routing in an efficient manner for similar packets, thereby preserving processing resources of the router.

Although the forwarding engine 302 always decides the "bridging" result for a frame, it can be overwritten by the shortcut engine 304. Each incoming frame received by the switch 300 is processed by the forwarding engine and only the packets going to or from special MAC addresses (i.e., addresses marked with the HW_SC bits 602) are processed by the shortcut engine 304. After the packet of a first frame is examined by the forwarding engine 302 and it is determined that shortcutting is appropriate for packets of this type, then the shortcut engine 304 forwards the second and subsequent packets, along with the rewrite information, over the bus to the port rather than to the router. This is an example of the shortcut engine overriding the forwarding engine's decision. (See FIG. 5, Step 524 "drive result with rewrite data for rewrite engine".)

While there has been shown and described an illustrative embodiment for implementing forwarding decision shortcuts at a switch for frames routed between subnetworks of a computer network, it is to be understood that various other adaptations and modifications may be made within the spirit and scope of the invention. For example in an alternate embodiment of the invention, the rewrite operations could be performed by the central rewrite engine 316 instead of the port coupled to the destination station. In this embodiment, the frame is sent directly to the central rewrite engine, as specified by the index, rather than to the port. The central rewrite engine 316 loads the rewrite information into the frame and drives the rewritten frame over the bus 310. The frame thus "looks" as if it came from the router and is then bridged to the destination station.

In yet another alternate embodiment, the switch 300 may be configured with a virtual local area network (VLAN) arrangement that virtually associates each port of the switch with a particular segregated network group. An example of a such an arrangement that may be advantageously used with the present invention is disclosed in U.S. Pat. No. 5,394,402, issued on Feb. 28, 1995 to Floyd E. Ross and titled *Hub for Segmented Virtual Local Area Network with Shared Media Access.*

Referring to FIG. 2, port A 302 may be configured to operate on, e.g., a is red VLAN, port B 304 may be configured to operate on a blue VLAN, and port R 306 may be configured to operate on both the red and blue VLANs.

In an embodiment where each VLAN encompasses an entire subnetwork, the router 250 and Station A 202 are on the red VLAN subnetwork, the router 250 and Station B 212 are on the blue VLAN subnetwork, and the router 250 routes packets between the red and blue VLANs. Within the red and blue VLAN subnetworks there may be other switches with many ports performing low-level bridging operations among themselves; the invention does not apply to these switching operations because that processing is performed at layer 2 of the switches. It should be noted that the invention may be further extended to a case where all the stations are on the same VLAN such that there are two layer 3 subnetworks on one layer 2 network segment.

In the case of a multi-VLAN configured switch, the rewrite information (Step 520 of FIG. 5) also includes a VLAN designation. Thus, for the sequence of steps described above, the source MAC address of the enable packet is the MAC address of the router, the destination MAC address is the MAC address of Station B and the VLAN is the VLAN of Station B. If the router forwards a frame out a port interface that is different from the interface on which the frame was received, it changes the VLAN designation. In the shortcut table 700, this VLAN designation is the rewrite VLAN (rwvlan 712).

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for implementing forwarding decision shortcuts at a switch for packets routed between subnetworks of a computer network, the method comprising the steps of:

rendering, at a router, a forwarding decision for routing a first packet of a particular type over the network;

establishing a shortcut entry in a shortcut table of the switch using information contained in a network layer header of the first packet;

receiving a subsequent packet of the particular type at the switch;

determining whether the shortcut entry has been established for the subsequent packet; and if so, implementing a forwarding decision shortcut for the subsequent packet at the switch based upon contents of the shortcut entry;

wherein the shortcut entry contains a pointer between a medium access control address and the information contained in the network layer header of the first packet.

2. The method of claim 1, wherein the step of rendering comprises the steps of:

receiving the first packet at the switch;

inserting predetermined information pertaining to the first packet into the shortcut table of the switch;

passing the first packet from the switch to the router; and performing a forwarding decision at the router to route the first packet over the network.

3. The method of claim 2, wherein the step of inserting comprises the steps of:

extracting a flow from the network layer header of the first packet;

retrieving an xtag from the forwarding table of the switch;

asserting a find_sc bit; and loading the flow, the xtag and the find_sc bit into the shortcut table.

4. The method of claim 3, wherein the step of establishing comprises the steps of:

determining whether the find_sc bit is asserted;

if so, noting information associated with the first packet that has changed as a result of the forwarding decision performed by the router; and writing the changed information into the shortcut entry as rewrite information.

5. The method of claim 4, wherein the rewrite information of the shortcut entry comprises an index identifying the physical location of the switch to which the subsequent packet is sent, and source and destination medium access control addresses for the subsequent packet.

6. The method of claim 4, wherein the step of implementing the forwarding decision shortcut comprises the steps of:
   driving the rewrite information from the shortcut table to a rewrite engine at the physical location identified by the index; and
   modifying other information associated with the subsequent packet with the rewrite information.

7. A switch for implementing forwarding decision shortcuts for packets routed between subnetworks of a computer network, a forwarding decision for a first packet being rendered by a router, the switch comprising:
   a forwarding table containing information specifying whether a medium access control (MAC) address associated with the packet identifies a special destination, the forwarding table further containing information specifying a pointer between the MAC address and network layer flow information contained in the packet;
   a forwarding engine coupled to the forwarding table and to access the forwarding table to determine whether a subsequent packet is a candidate for a forwarding decision shortcut;
   a shortcut table containing the flow information; and
   a shortcut engine coupled to the shortcut table and forwarding engine, the shortcut engine to access the shortcut table to one of insert a candidate entry into the shortcut table and establish a shortcut entry in the shortcut table.

8. The switch of claim 7, wherein the forwarding engine and the shortcut engine are implemented as a state machine.

9. The switch of claim 7, wherein the flow information comprises a network layer destination address.

10. The switch of claim 9, wherein the flow information further comprises a network layer source address.

11. The switch of claim 10, wherein the flow information further comprises a protocol port number.

12. The switch of claim 9, wherein the pointer comprises an xtag value.

13. The switch of claim 7, wherein the special destination comprises one of the router or a multicast packet.

14. The switch of claim 12, wherein the candidate entry comprises the flow information, the xtag value and a find_sc bit.

15. The switch of claim 12, wherein the shortcut entry comprises the flow information, the xtag value and rewrite information, the rewrite information including source and destination data link layer address associated with the subsequent packet.

16. The switch of claim 15, further comprising:
   a bus of the switch;
   interface circuitry for coupling the bus to the router; and
   a port card having at least one port coupling the bus to physical media of the network.

17. The switch of claim 16, further comprising an in-line rewrite engine associated with each port of the port card, the in-line rewrite engine modifying shortcutted frame with the rewrite information.

18. The switch of claim 16, further comprising a central rewrite engine coupled to the bus, the central rewrite engine modifying shortcutted frames with the rewrite information.

19. A mechanism for implementing forwarding decision shortcuts at a switch for packets of a particular type routed between subnetworks of a computer network, the mechanism comprising:
   means for receiving a candidate packet of the particular type at the switch;
   means for inserting predetermined information pertaining to the candidate packet into a shortcut table of the switch;
   means for passing the candidate packet from the switch to a router;
   means for rendering, at the router, a forwarding decision for the candidate packet;
   means for passing the candidate packet from the router to the switch as an enable packet of the particular type;
   means for comparing the inserted information with respective predetermined information pertaining to the enable packet;
   means for, if the information matches, establishing a shortcut entry in the shortcut table;
   means for receiving a subsequent packet of the particular type at the switch;
   means for determining whether the shortcut entry has been established for the subsequent packet; and
   means for routing the subsequent packet from the switch over the network based upon contents of the shortcut entry if the shortcut entry has been established for the subsequent packet;
   wherein the shortcut entry contains a pointer between a medium access control address and information contained in a network layer header of the subsequent packet.

20. The mechanism of claim 19, wherein the means for inserting comprises:
   means for extracting a flow from a network layer header of the candidate packet;
   means for retrieving an xtag from a forwarding table of the switch;
   means for asserting a find_sc bit; and
   means for loading the flow, the xtag and the find_sc bit into the shortcut table.

21. A mechanism for implementing forwarding decision shortcuts at a switch for packets routed between subnetworks of a computer network, the mechanism comprising:
   means for rendering, at a router, a forwarding decision for routing a first packet of a particular type over the network;
   means for establishing a shortcut entry in a shortcut table of the switch using information contained in a network layer header of the first packet;
   means for receiving a subsequent packet of the particular type at the switch;
   means for determining whether the shortcut entry has been established for the subsequent packet; and
   means for implementing a forwarding decision shortcut for the subsequent packet at the switch based upon contents of the shortcut entry if the shortcut entry has been established for the subsequent packet;
   wherein the shortcut entry contains a pointer between a medium access control address and the information contained in the network layer header of the first packet.

22. The mechanism of claim 21, wherein the means for rendering comprises:
   means for receiving the first packet at the switch;
   means for inserting predetermined information pertaining to the first packet into the shortcut table of the switch;
   means for passing the first packet from the switch to the router; and means for performing a forwarding decision at the router to route the first packet over the network.

23. The mechanism of claim 22, wherein the means for inserting comprises:
means for extracting a flow from the network layer header of the first packet;
means for retrieving an xtag from the forwarding table of the switch;
means for asserting a find_sc bit; and
means for loading the flow, the xtag and the find_sc bit into the shortcut table.

24. The mechanism of claim 23, wherein the means for establishing comprises:
means for determining whether the find_sc bit is asserted;
means for noting information that has changed pertaining to the first packet as a result of the forwarding decision performed by the router; and
means for writing the changed information into the shortcut entry as rewrite information.

25. The mechanism of claim 24, wherein the rewrite information of the shortcut entry comprises an index identifying the physical location of the switch to which the subsequent packet is sent, and source and destination medium access control addresses for the subsequent packet.

26. The mechanism of claim 24, wherein the means for implementing the forwarding decision shortcut comprises:
means for driving the rewrite information from the shortcut table to a rewrite engine at the physical location identified by the index; and
means for modifying information pertaining to the subsequent packet with the rewrite information.

27. Computer-readable memory comprising computer-executable instructions that when executed implement forwarding decision shortcuts at a switch for packets routed between subnetworks of a computer network, the instructions, when executed, also causing:
rendering, at a router, of a forwarding decision for routing a first packet of a particular type over the network;
establishing of a shortcut entry in a shortcut table of the switch using information contained in a network layer header of the first packet;
receiving of a subsequent packet of the particular type at the switch;
determining of whether the shortcut entry has been established for the subsequent packet of the subsequent frame; and if so,
implementing of a forwarding decision shortcut for the subsequent packet at the switch based upon contents of the shortcut entry;
wherein the shortcut entry contains a pointer between a medium access control address and the information contained in the network layer header of the first packet.

28. Memory of claim 27, wherein the rendering of the forwarding decision comprises:
receiving of the first packet at the switch;
inserting of predetermined information pertaining to the first packet into the shortcut table of the switch;
passing of the first packet from the switch to the router; and
performing of a forwarding decision at the router to route the first packet over the network.

29. Memory of claim 28, wherein the inserting of the predetermined information comprises:
extracting of a flow from the network layer header of the first packet;
retrieving of an xtag from the forwarding table of the switch;
asserting of a find_sc bit; and
loading of the flow, the xtag and the find_sc bit into the shortcut table.

30. Memory of claim 29, wherein the establishing of the shortcut entry comprises:
determining of whether the find_sc bit is asserted;
if so, noting of information that has changed pertaining to the first packet as a result of the forwarding decision performed by the router; and
writing of the changed information into the shortcut entry as rewrite information.

31. Memory of claim 30, wherein the rewrite information of the shortcut entry comprises an index identifying the physical location of the switch to which the subsequent packet is sent, and source and destination medium access control addresses for the subsequent packet.

32. Memory of claim 30, wherein the implementing of the forwarding decision shortcut comprises:
driving of the rewrite information from the shortcut table to a rewrite engine at the physical location identified by the index; and
modifying of information pertaining to the subsequent packet with the rewrite information.

33. Computer-readable memory comprising computer-readable instructions that when executed cause implementing of forwarding decision shortcuts at a switch for packets of a particular type routed between subnetworks of a computer network, the instructions when executed also causing:
receiving of a candidate packet of the particular type at the switch;
inserting of predetermined information pertaining to the candidate packet into a shortcut table of the switch;
passing of the candidate packet from the switch to a router;
rendering, at the router, of a forwarding decision for the candidate packet;
passing of the candidate packet from the router to the switch as an enable packet of the particular type;
comparing of the inserted information with respective predetermined information pertaining to the enable packet;
if the information matches, establishing of a shortcut entry in the shortcut table;
receiving of a subsequent packet of the particular type at the switch;
determining of whether the shortcut entry has been established for the subsequent packet; and if so,
routing of the subsequent packet from the switch over the network based upon contents of the shortcut entry;
wherein the shortcut entry contains a pointer between a medium access control address and information contained in a network layer header of the subsequent packet.

34. Memory of claim 33, wherein the inserting of the predetermined information comprises:
extracting of a flow from a network layer header of the candidate packet;
retrieving of an xtag from a forwarding table of the switch;

asserting of a find_sc bit; and loading of the flow, the xtag and the find_sc bit into the shortcut table.

35. A mechanism for implementing forwarding decision short-cuts at a switch for packets of a particular type routed between subnetworks of a computer network, the mechanism comprising:

a reception mechanism that receives a candidate packet of the particular type at the switch;

a processor that is to maintain, in operation, a shortcut table of the switch, the processor also to insert, in operation, predetermined information pertaining to the candidate packet into the shortcut table;

a transmission mechanism that transmits the candidate packet from the switch to a router, the router to render a forwarding decision for the candidate packet;

another transmission mechanism that transmits the candidate packet from the router to the switch as an enable packet of the particular type;

the processor also to compare, in operation, the inserted information with respective predetermined information pertaining to the enable packet, and if the information matches, to establish, in operation, a shortcut entry in the shortcut table;

the reception mechanism also receiving a subsequent packet of the particular type at the switch;

the processor additionally to determine, in operation, whether the shortcut entry has been established for the subsequent packet; and a routing mechanism that routes the subsequent packet from the switch over the network based upon contents of the shortcut entry, if the shortcut entry has been established for the subsequent packet;

wherein the shortcut entry contains a pointer between a medium access control address and information contained in a network layer header of the subsequent packet.

36. The mechanism of claim 35, wherein the processor is to insert the predetermined information, in operation, by:

extracting a flow from a network layer header of the candidate packet;

retrieving an xtag from a forwarding table of the switch;

asserting a find_sc bit; and loading the flow, the xtag and the find_sc bit into the shortcut table.

* * * * *